US 6,620,314 B2

(12) United States Patent
Tully et al.

(10) Patent No.: US 6,620,314 B2
(45) Date of Patent: Sep. 16, 2003

(54) PRODUCTION OF PYROGEN CONTROLLED WATER

(75) Inventors: William Tully, Midleton (IE); Evelyn Madigan, Carrigaline (IE)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 10/172,616

(22) Filed: Jun. 14, 2002

(65) Prior Publication Data

US 2002/0157994 A1 Oct. 31, 2002

Related U.S. Application Data

(63) Continuation of application No. PCT/IE00/00159, filed on Dec. 18, 2000.

(30) Foreign Application Priority Data

Dec. 17, 1999 (WO) ................................ PCT/IE99/00140

(51) Int. Cl.[7] .............................................. B01D 61/12
(52) U.S. Cl. ........................... 210/87; 210/90; 210/97; 210/241; 210/253; 210/323.2; 210/203; 210/409; 210/321.72
(58) Field of Search .............................. 210/85, 87, 90, 210/97, 241, 253, 323.2, 340, 341, 409, 203, 900, 321.72, 321.79–321.81; 73/863

(56) References Cited

U.S. PATENT DOCUMENTS

| 4,495,067 A | 1/1985 | Klein et al. |
| 4,708,803 A | 11/1987 | Ostreicher et al. |
| 4,810,388 A | 3/1989 | Trasen |
| 5,075,002 A | 12/1991 | Thalmann et al. |
| 5,167,808 A | * 12/1992 | Carr et al. |
| 5,405,528 A | 4/1995 | Selbie et al. |
| 5,538,638 A | 7/1996 | Hedman |
| 5,622,626 A | 4/1997 | Matkovich et al. |
| 5,972,216 A | * 10/1999 | Acernese et al. |

FOREIGN PATENT DOCUMENTS

| FR | 2 294 716 | 7/1976 |
| WO | WO 91/05576 | 5/1991 |
| WO | WO 97/38786 | 10/1997 |
| WO | WO 98/01208 | 1/1998 |

OTHER PUBLICATIONS

PCT International Search Report for PCT/IE00/00159.

* cited by examiner

Primary Examiner—Joseph Drodge
Assistant Examiner—Terry K. Cecil
(74) Attorney, Agent, or Firm—Francis J. Tinney

(57) ABSTRACT

A unit 1 for producing pyrogen controlled water on a small to medium factory scale comprises a number of charged ultrafiltration units 10 arranged in parallel. Orifice plates 15 are used to restrict and control the flow of deionized water to each filter 10. The filter units 10 are mounted on a frame 2 with a wheeled chassis 3 which may be pushed or moved by a forklift truck to a site where pyrogen controlled water is required. The unit 1 has an inlet line 4 for connection to a supply of deionized water and an outlet line 6 for connection to a user of pyrogen controlled water. The unit 1 may be purged with nitrogen from a supply 18. Sampling ports 17 in a common supply inlet 4 and a common outlet 6 ensure that the filtration efficiency can be closely monitored. The flow of water is monitored by a flowmeter 19 and pressure sensors 16 upstream of each filter facilitate a high level of control.

10 Claims, 4 Drawing Sheets

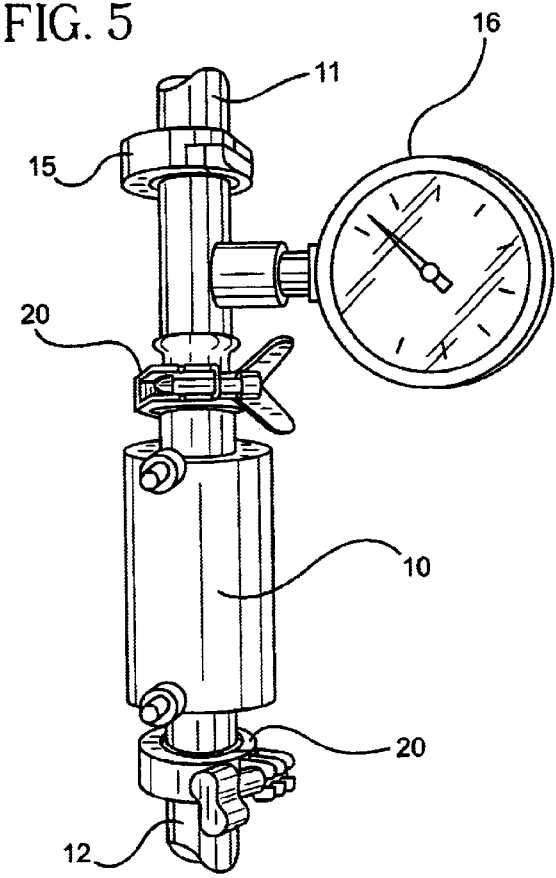
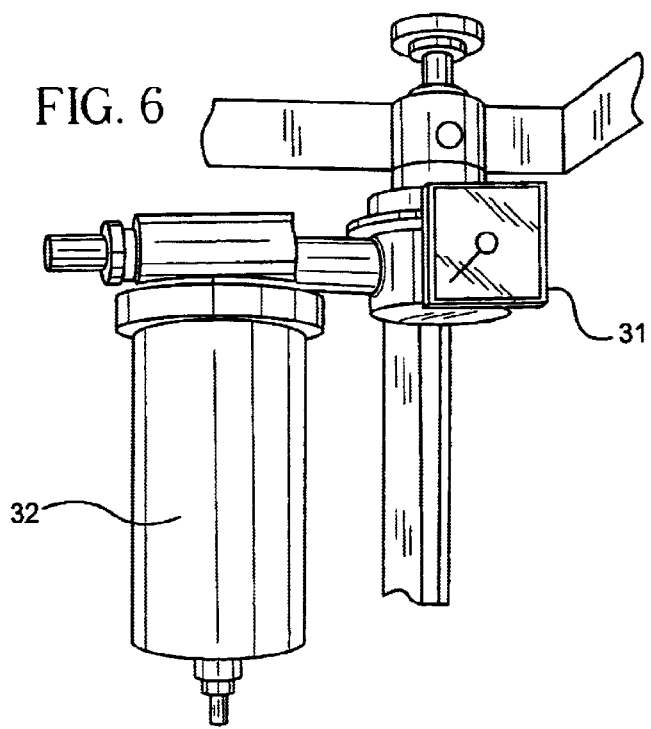

PRODUCTION OF PYROGEN CONTROLLED WATER

RELATED APPLICATIONS

This application is related to and claims benefit of the following applications: International application PCT/IE 00/00159 filed Dec. 18, 2000, which claims priority from international application PCT/IE 99/00140 filed Dec. 17, 1999, all of which are incorporated herein by reference in their entirety.

FIELD OF THE INVENTION

The invention relates to a device for the generation of pyrogen controlled water used especially for the preparation of active pharmaceuticals for injectable formulations.

BACKGROUND OF THE INVENTION

Pyrogen contamination of water used in the production of pharmaceutical products is a major concern of pharmaceutical manufacturers and regulatory authorities. Both chemical and biological pyrogenicity are well-documented and by far the most significant pyrogen within the pharmaceutical industry is bacterial endotoxins.

Bacterial cell associated endotoxins are high molecular weight lipopolysaccharide-protein complexes within an outer membrane of Gram negative bacteria. Endotoxins are ubiquitous and are found in any liquid where Gram negative bacteria are present. They are continually shed into the surrounding environment by the bacteria during cell growth, division, and on cell death, when the bacteria fragment.

Pyrogenic substances produce an increase in body temperature after intravenous injection into man and most animals. Bacterial endotoxins intravenously injected result in the development of fever by inducement of synthesis and release of endogenous pyrogens from host bone marrow derived phagocytic leukocytes. These in turn induce a wide range of chemically harmful events which are manifested in the febrile response.

Methods currently applied in the preparation of high purity water primarily involve distillation or reverse osmosis. Current methods used effectively remove endotoxins by liquid/vapor phase separation and by solute rejection, respectively. There are other methods for the removal of endotoxins in high purity pharmaceutical water systems such as ultrafiltration; however of all the methods currently used, positively charged filter media are unique in utilizing low pore size for selective removal of pyrogen assisted by opposite charge attraction of the negatively charged pyrogen to the filter media. However, the use of such filter media to generate pyrogen controlled water requires stringent control of operation.

The object of the present invention is to provide a portable high purity water unit that utilizes positively charged filter media and which incorporates controls to provide a validated water system on a small to medium scale that has low capital cost, high efficiency, and is easy to use.

SUMMARY OF THE INVENTION

According to the invention, there is provided a pyrogen controlled water producing unit for producing pyrogen controlled water on a small to medium factory scale comprising:
 (a) a transportable support frame;
 (b) a number of filter cartridges, each containing positively charged filter media, the cartridges being mounted to the frame and arranged in parallel, each filter cartridge having an inlet conduit from a common inlet supply and an outlet conduit to a common outlet;
 (c) flow restricting means mounted in each filter inlet conduit to control the flow of water through the filter;
 (d) a flowmeter in the inlet supply for monitoring the flow of water to the filters;
 (e) the inlet supply having a nitrogen purge inlet port for purging the filters and the conduits; and
 (f) an outlet port from the common filter outlet at the lowest point in the unit.

In one embodiment of the invention the flow restricting means comprises an orifice plate.

In another embodiment the unit comprises pressure sensor means upstream of the filters for monitoring back pressure from the filters.

Preferably, a pressure sensor is provided in each filter inlet conduit.

Most preferably, the unit comprises at least one sampling port for water sampling.

Ideally, the unit has a sampling port located in the common supply inlet and a sampling port located in the common supply outlet.

The unit preferably comprises a fitting in the common inlet supply for connection to a supply of deionized water. Preferably, the device also includes a fitting in the common outlet for user connection to a pyrogen controlled water supply. The fitting is preferably a quick release coupling.

Preferably the transportable frame has a wheeled chassis. Most preferably the transportable frame has a forklift mounting means.

The invention facilitates close control of flow rates of the water applied to the positively charged filter media. This results in maximum efficiency of endotoxin removal. The unit also facilitates in situ sanitization of the media and pipes together with sterile sampling of the high purity water produced.

BRIEF DESCRIPTION OF THE DRAWINGS

The invention will be more clearly understood from the following description given by way of example only with reference to the accompanying drawings in which:

FIG. 5 is a perspective view on an enlarged scale of a filter of the unit; and

FIG. 6 is a perspective view on an enlarged scale of a nitrogen filter and regulation gauge of the unit.

DETAILED DESCRIPTION OF THE INVENTION

Figure 1:
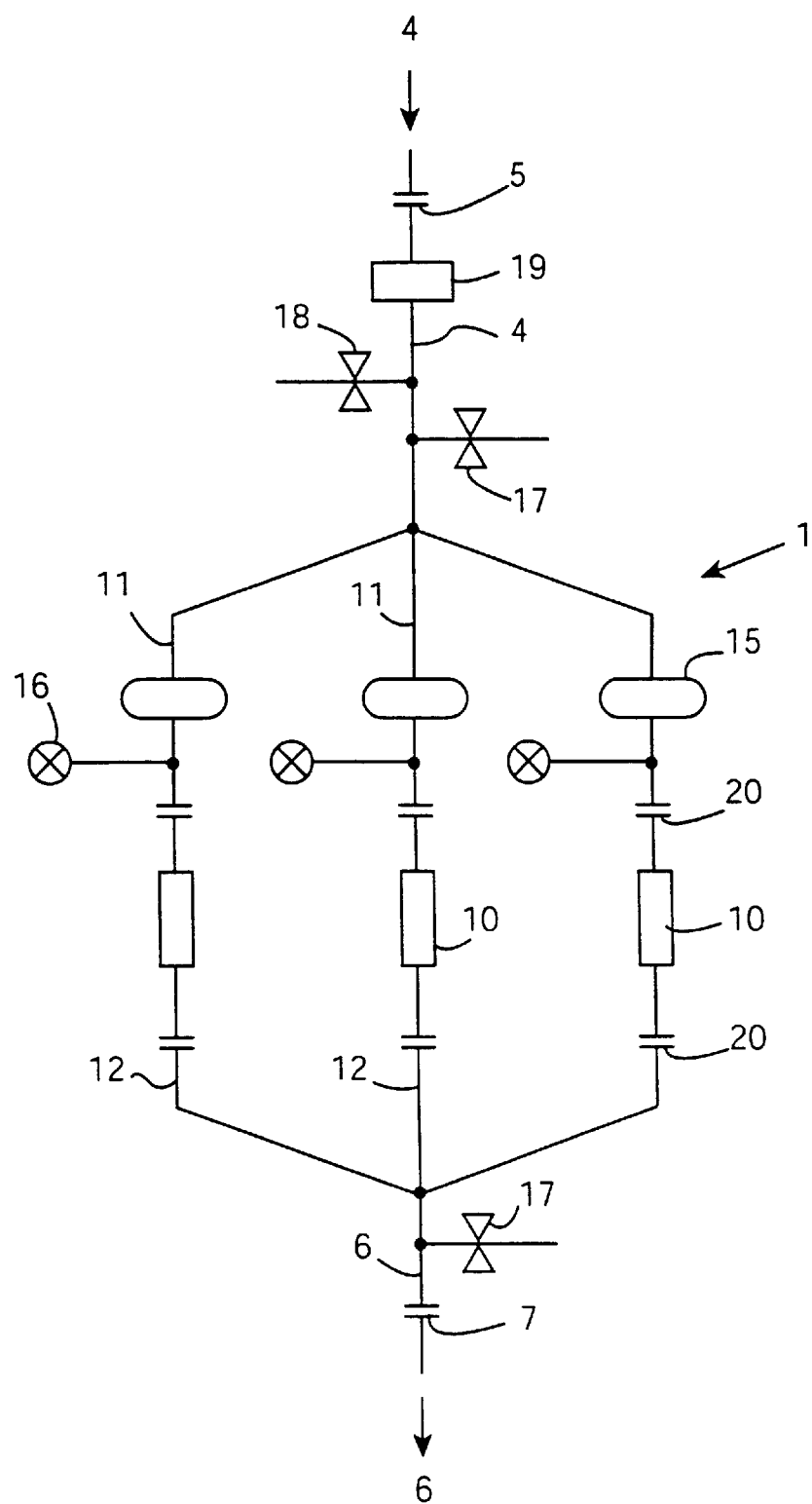
FIG. 1 is a schematic representation of a unit for producing pyrogen controlled water according to the invention.
Figure 2:
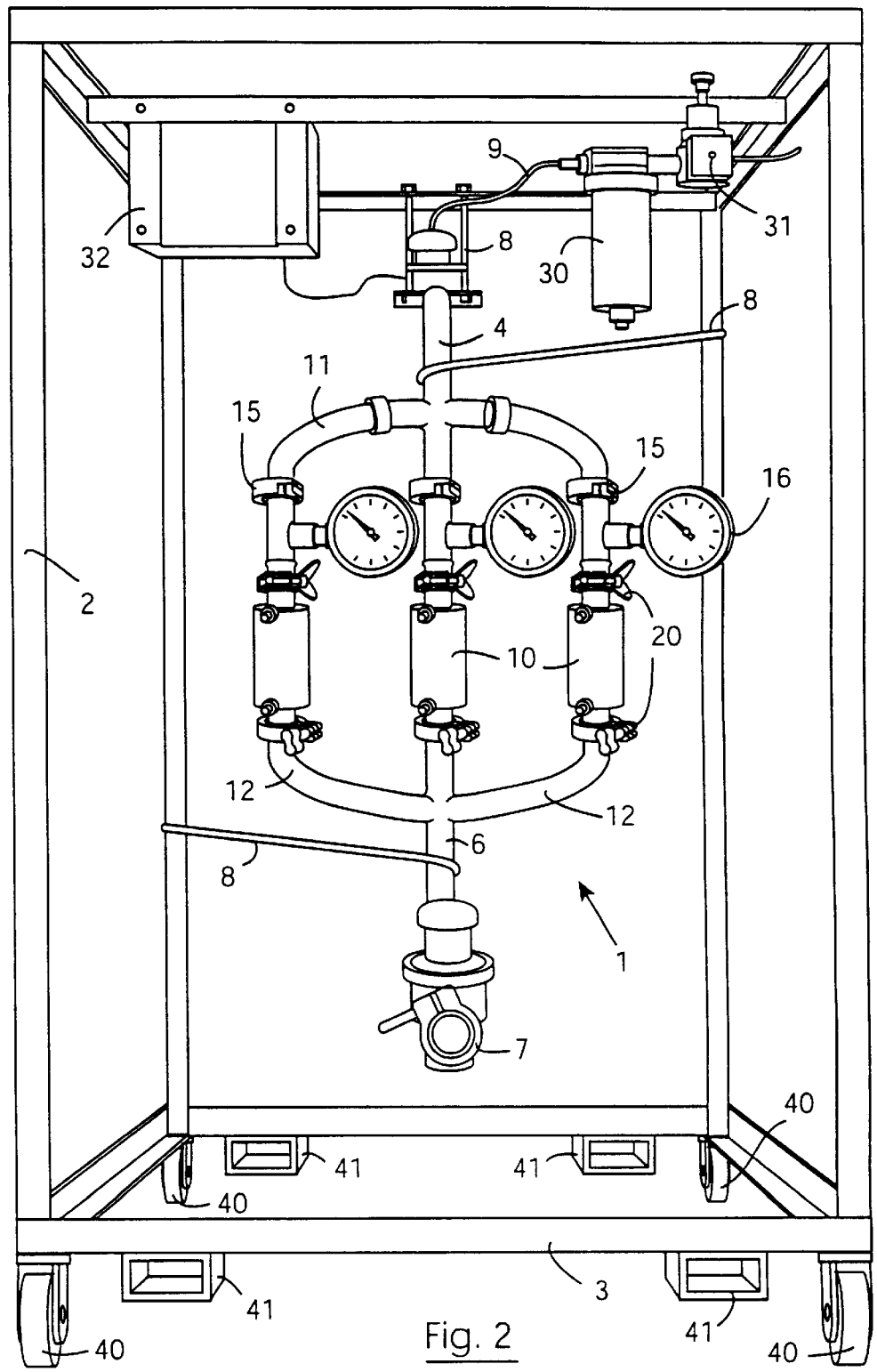
FIG. 2 is a front perspective view of the unit according to the invention.
Figure 3:
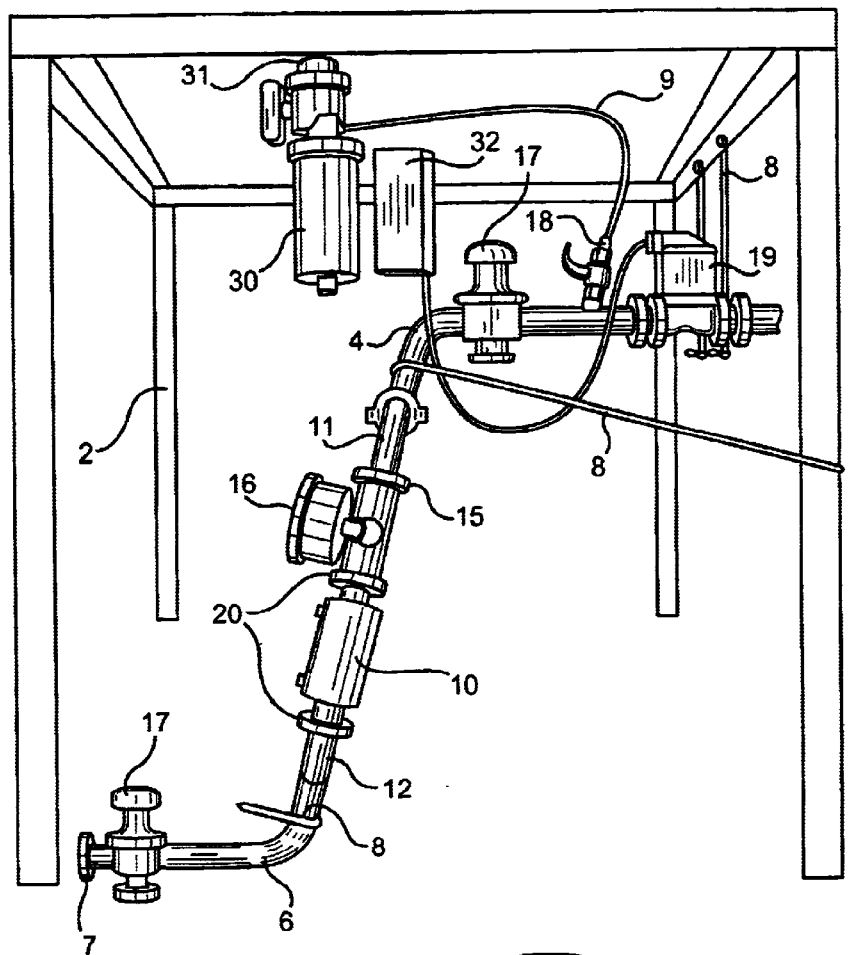
FIG. 3 is a side perspective view of the unit of FIG. 2.
Figure 4:
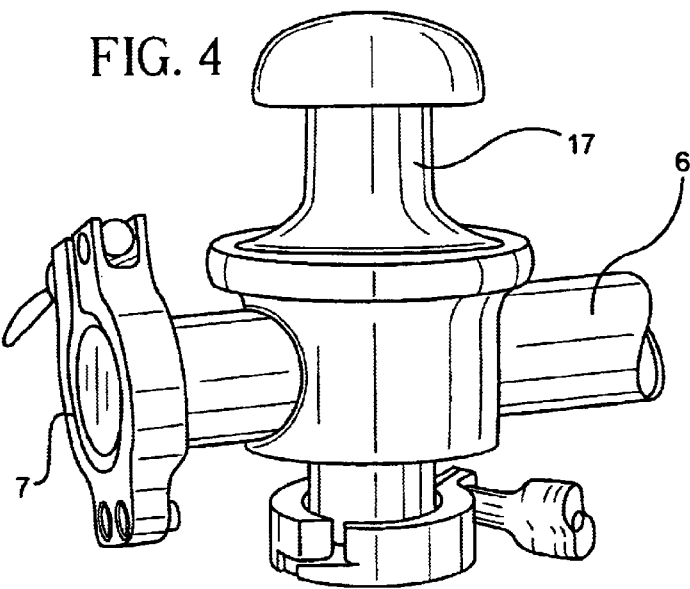
FIG. 4 is a perspective view on an enlarged scale of an outlet/portion complete with triclover fitting and sampling valve and sample point fitting.

Referring to FIG. 1 to FIG. 3, there is illustrated a unit 1 for producing pyrogen controlled water on a small to medium factory scale. The unit 1 comprises a frame 2 mounted on a wheeled chassis 3 which may be pushed on wheels 40 or moved by a forklift truck engaging forklift engagement brackets 41 to a site where pyrogen controlled water is required.

Referring to FIG. 1 in particular there is illustrated a schematic representation of a device 1 for producing pyrogen controlled water on a small to medium factory scale. The device 1 has an inlet line 4 with a quick release triclover fitting 5 for connection to a supply of deionized water and an outlet line 6 with a triclover fitting 7 for connection to a user of pyrogen controlled water.

A number of filter cartridges, in this case three filter cartridges 10, are arranged in parallel, each filter cartridge 10 having an inlet conduit 11 from the common supply inlet line 4 and an outlet conduit 12 to the common outlet 6. A flow restricting orifice plate 15 is installed in each of the inlet conduits 11 to limit the maximum flow of deionized water to the filters 10. A pressure sensor 16 is installed upstream of each filter 10 for monitoring back pressure from the filters 10. Sanitary flush valve/sampling ports 17 are located both upstream and downstream of the filters 10 in the common supply inlet line 4 and the common outlet line 6. Brackets 8 are used to mount the assembly of the filters and associated pipework to the frame 2.

A filtered nitrogen supply inlet 18 at a predetermined pressure is located on the common supply inlet 4 and allows the system to be purged with nitrogen to remove unused water from the system. Filtered nitrogen is delivered from a nitrogen filter 30 to the nitrogen supply inlet 18 via a connection tube 9. As illustrated particularly in FIG. 2 and FIG. 3, inlet nitrogen is filtered by passing through the nitrogen filter 30. Flow of nitrogen through the filter 30 is regulated by a pressure gauge/regulator 31. Upstream of the nitrogen supply inlet 18 is a flowmeter 19 for monitoring the flow of water to the filters 10. The flowmeter 19 is connected to a controller 32 which monitors the flow of water through the system. Triclover connector fittings 20 upstream and downstream of each filter 10 allow the filters to be easily removed from the system and replaced.

Each of the filter cartridges preferably contain positively charged ultra filtration material. The filters are commercially available, for example, Posidyne Pall $N_{66}$™ filters. Such filters are capable of efficiently removing negatively charged contaminants such as endotoxins as well as removal of particles. The filters 10 have valves that may be used to drain superfluous water from the housing when not in use.

Referring in particular to FIG. 2 to FIG. 5 in use, deionized water enters the device 1 through the common supply inlet line 4 along the three inlet conduits 11 to the filters 10. After filtering, the water passes along the outlet conduits 12 to the common outlet 6, which may be connected to a user of pyrogen controlled water by means of a triclover fitting 7.

The unit is self-draining which allows complete displacement flow through the unit when in operation and full drainage when not in use. The unit can be fully sanitized with the positively charged filters 10 in situ by charging 200 ppm sodium hypochlorite solution through the lowest point and filling until the solution exits through the high level sampling point 17.

Each filter is supplied with water at less then 3 liters per minute as controlled by the orifice plate 15. Back pressure values of greater than 4 bar indicate that the filter media is spent and should be changed.

At any point in the water generation process, a sample can be collected from the sanitary flush valve/sampling port 17 and taken for analysis. When not in use the unit can be fully drained and sealed.

The filter unit of the present invention is capable of consistently producing bulk quantities, up to 540 liters/hour of pyrogen controlled water with endotoxins levels of not more than 5.0 EU/mL. The system can be fully validated and sanitized at a predetermined frequency.

The filter unit is used on a small to medium factory scale for highly efficient preparation of pyrogen controlled water for use in the preparation of active pharmaceuticals for injectable formulations.

The invention is not limited to the embodiments hereinbefore described which may be varied in detail.

What is claimed is:

1. A pyrogen controlled water producing unit for producing pyrogen controlled water on a small to medium factory scale comprising:
   (a) a transportable support frame;
   (b) a number of filter cartridges, each containing positively charged filter media, the cartridges being mounted to the frame and arranged in parallel, each filter cartridge having an inlet conduit from a common inlet supply and an outlet conduit to a common outlet;
   (c) a flow restrictor mounted in each filter cartridge inlet conduit to control the flow of water through the filter cartridge;
   (d) a flowmeter in the inlet supply for monitoring the flow of water to the filter cartridges;
   (e) the inlet supply having a nitrogen purge inlet port for purging the filter cartridges and the conduits; and
   (f) an outlet port from the common filter outlet at the lowest point in the unit.

2. A unit as claimed in claim 1 wherein the flow restrictor comprises an orifice plate.

3. A unit as claimed in claim 1 comprising a pressure sensor upstream of the filter cartridges for monitoring back pressure from the filters.

4. A unit as claimed in claim 3 wherein a pressure sensor is provided in each filter inlet conduit.

5. A unit as claimed in claim 1 comprising at least one sampling port for water sampling.

6. A unit as claimed in claim 5 comprising a sampling port located in the common supply inlet and a sampling port located in the common supply outlet.

7. A unit as claimed in claim 1 comprising a fitting in the common inlet supply for connection to a supply of deionized water.

8. A unit as claimed in claim 1 comprising a fitting in the common outlet for connection to a pyrogen controlled water supply.

9. A unit as claimed in claim 1 comprising a wheeled chassis, the transportable frame being mounted on the wheeled chassis.

10. A unit as claimed in claim 1 comprising a forklift tine receiver, the forklift tine receiver being provided on the transportable frame.

* * * * *